United States Patent
Shimizu

(10) Patent No.: US 11,085,512 B2
(45) Date of Patent: Aug. 10, 2021

(54) ELECTRIC ACTUATOR

(71) Applicant: NTN CORPORATION, Osaka (JP)

(72) Inventor: Tatsunori Shimizu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 13 days.

(21) Appl. No.: 16/344,417

(22) PCT Filed: Oct. 24, 2017

(86) PCT No.: PCT/JP2017/038359
§ 371 (c)(1),
(2) Date: Apr. 24, 2019

(87) PCT Pub. No.: WO2018/079549
PCT Pub. Date: May 3, 2018

(65) Prior Publication Data
US 2020/0049236 A1    Feb. 13, 2020

(30) Foreign Application Priority Data
Oct. 31, 2016    (JP) .............................. JP2016-213146

(51) Int. Cl.
*F16H 25/20*    (2006.01)
*F16H 25/22*    (2006.01)
(Continued)

(52) U.S. Cl.
CPC .............. *F16H 25/20* (2013.01); *H02K 5/24* (2013.01); *H02K 7/06* (2013.01); *H02K 7/116* (2013.01);
(Continued)

(58) Field of Classification Search
CPC ..... B62D 33/07; B62D 5/0448; F16C 19/185; F16H 25/20; F16H 25/22; F16H 25/2454;
(Continued)

(56) References Cited

U.S. PATENT DOCUMENTS 2,956,451 A * 10/1960 Bowman ............... F16H 1/2809
475/344
5,240,462 A * 8/1993 Mochizuki ........... F16H 1/2863
475/341
(Continued)

FOREIGN PATENT DOCUMENTS

CN        104505978        4/2015
EP        1 873 041        1/2008
(Continued)

OTHER PUBLICATIONS

International Search Report dated Jan. 23, 2018 in International (PCT) Application No. PCT/JP2017/038359.
(Continued)

*Primary Examiner* — Jake Cook
*Assistant Examiner* — T. Scott Fix
(74) *Attorney, Agent, or Firm* — Wenderoth, Lind & Ponack, L.L.P.

(57) ABSTRACT

Provided is an electric actuator, including: a driving motor (2); a motion conversion mechanism (6) configured to convert a rotary motion of the driving motor (2) to a linear motion in an axial direction parallel with an output shaft (2a) of the driving motor (2); and a transmission gear mechanism (5) configured to transmit a driving force from the driving motor (2) to the motion conversion mechanism (6). The driving motor (2) is mounted to an actuator case (9) to which a double-row bearing (24) configured to support the motion conversion mechanism (6) and a bearing (19) configured to support the transmission gear mechanism (5) are mounted.

2 Claims, 11 Drawing Sheets

(51) Int. Cl.
  *H02K 5/24* (2006.01)
  *H02K 7/116* (2006.01)
  *H02K 7/06* (2006.01)
(52) U.S. Cl.
  CPC .. *F16H 25/2204* (2013.01); *F16H 2025/2062* (2013.01); *F16H 2025/2081* (2013.01)
(58) Field of Classification Search
  CPC ............. F16H 25/2015; F16H 25/2204; F16H 2025/2081; F16H 2025/2087; F16H 57/023; F16H 2057/0235; H02K 7/06; H05K 5/0204; H05K 5/0073; H05K 5/0217; H05K 5/069; H05K 5/066; H05K 7/14
  USPC ........................................................ 74/89.34
  See application file for complete search history.

(56) References Cited

U.S. PATENT DOCUMENTS

| | | | | |
|---|---|---|---|---|
| 5,791,191 | A * | 8/1998 | Wittenstein | F16H 57/025 403/3 |
| 6,158,897 | A * | 12/2000 | Sivonen | F16C 25/083 384/518 |
| 7,396,313 | B2 * | 7/2008 | Casanova | F16H 1/46 475/331 |
| 7,537,080 | B2 * | 5/2009 | Murakami | B62D 5/0424 180/444 |
| 8,141,445 | B2 * | 3/2012 | Yoshioka | F16C 35/063 29/505 |
| 2003/0000766 | A1 * | 1/2003 | Tatewaki | B62D 5/0448 180/444 |
| 2005/0272548 | A1 | 12/2005 | Nagai et al. | |
| 2006/0213298 | A1 * | 9/2006 | Tateishi | F16H 25/2204 74/89.23 |
| 2007/0151794 | A1 * | 7/2007 | Mizutani | B62D 5/0448 180/444 |
| 2008/0006471 | A1 | 1/2008 | Nakamura et al. | |
| 2008/0092679 | A1 | 4/2008 | Tateishi et al. | |
| 2009/0260463 | A1 | 10/2009 | Fukano et al. | |
| 2010/0051378 | A1 * | 3/2010 | Kurokawa | F16H 55/06 180/444 |
| 2012/0186896 | A1 * | 7/2012 | Yamamoto | B62D 5/0448 180/444 |
| 2013/0118827 | A1 * | 5/2013 | Imanishi | B62D 5/0448 180/443 |
| 2013/0249335 | A1 * | 9/2013 | Motoda | H02K 11/0094 310/71 |
| 2015/0211624 | A1 * | 7/2015 | Pasaribu | F16C 33/6633 74/416 |
| 2016/0319922 | A1 * | 11/2016 | Fukunaga | F16C 33/723 |
| 2017/0050669 | A1 * | 2/2017 | Asakura | B62D 5/0481 |
| 2017/0089435 | A1 * | 3/2017 | Tsai | F16H 25/20 |
| 2017/0145727 | A1 * | 5/2017 | Yamagata | E05F 15/622 |
| 2017/0291590 | A1 * | 10/2017 | Shigeta | F15B 7/08 |

FOREIGN PATENT DOCUMENTS

| | | |
|---|---|---|
| JP | 2000-120810 | 4/2000 |
| JP | 2006-22950 | 1/2006 |
| JP | 2008-116037 | 5/2008 |
| JP | 2013-038846 | 2/2013 |
| JP | 2013-103696 | 5/2013 |

OTHER PUBLICATIONS

International Preliminary Report on Patentability and Written Opinion of the International Searching Authority dated Apr. 30, 2019 in International (PCT) Application No. PCT/JP2017/038359.
Extended European Search Report dated May 4, 2020 in corresponding European Patent Application No. 17864040.5.
Chinese Office Action dated Aug. 12, 2020 in counterpart Chinese patent application No. 201780067486.2 with English translation of Search Report.

* cited by examiner

ELECTRIC ACTUATOR

TECHNICAL FIELD

The present invention relates to an electric actuator.

BACKGROUND ART

In recent years, electrification of vehicles and the like has been promoted for power saving and reduction in fuel consumption. For example, a system for operating an automatic transmission, a brake, a steering wheel, and the like of an automobile with use of power of an electric motor has been developed and brought to the market. As an actuator for use in such an application, there has been known an electric linear actuator employing a ball screw mechanism configured to convert a rotary motion of an electric motor into a motion in a linear direction.

For example, in Patent Literature 1, there is proposed an electric linear actuator in which a speed reduction mechanism and a ball screw mechanism are assembled to one bracket so that the number of components is reduced compared to a related-art configuration including those drive members mounted to two split housings, thereby achieving a reduction in weight with a simple structure and a reduction in number of steps for assembly, to thereby reduce the cost. Specifically, as illustrated in FIG. 11, a speed reduction mechanism 210 is formed of an input gear 211 and an output gear 212 configured to mesh with the input gear 211. The input gear 211 is mounted to a motor shaft of an electric motor 230 mounted to a bracket 220. Meanwhile, the output gear 212 is fixed integrally to a nut 241 of a ball screw mechanism 240. Further, the nut 241 of the ball screw mechanism 240 is rotatably supported by the bracket 220 through intermediation of a single-row support bearing 250, with the result that the respective drive members are assembled to the bracket 220.

CITATION LIST

Patent Literature 1: JP 2013-38846 A

SUMMARY OF INVENTION

Technical Problem

Incidentally, it is required to maintain an axis-to-axis distance L (see FIG. 11) between the drive members with high precision in order to efficiently transmit a driving force of the electric motor to the ball screw mechanism. However, in the configuration described in Patent Literature 1, support of the input gear 211 of the speed reduction mechanism 210 and the nut 241 of the ball screw mechanism 240 with respect to the bracket 220 is particularly insecure. For example, in a case in which a vibration is applied to the electric linear actuator, runouts occur in shafts thereof, and the axis-to-axis distance may fluctuate.

Therefore, it is an object of the present invention to provide an electric actuator capable of maintaining the axis-to-axis distance between the drive members with high precision.

Solution to Problem

As a technical measure to attain the above-mentioned object, according to one embodiment of the present invention, there is provided an electric actuator, comprising: a driving motor; a motion conversion mechanism configured to convert a rotary motion of the driving motor to a linear motion in an axial direction parallel with an output shaft of the driving motor; and a transmission gear mechanism configured to transmit a driving force from the driving motor to the motion conversion mechanism, wherein the driving motor is mounted to an actuator case to which a double-rowbearing configured to support the motion conversion mechanism and a bearing configured to support the transmission gear mechanism are mounted.

As described above, the driving motor is mounted to the actuator case. With this, the driving motor, the motion conversion mechanism, and the transmission gear mechanism are mounted to and supported by the same case (actuator case) in such a manner. As a result, a precision in relative positions among those drive members increases. That is, those drive members are not mounted to separate cases. Thus, a relative positional relationship among the drive members is not influenced by a precision in assembling the cases to one another, and a precision in the axis-to-axis distance (in the radial direction) between the drive members increases. Moreover, the motion conversion mechanism is supported by the double-row bearing mounted to the actuator case, and the transmission gear mechanism is supported by the bearing mounted to the actuator case. Thus, postures of the motion conversion mechanism and the transmission gear mechanism are stabilized, thereby being capable of reducing runouts of the shafts thereof. In such a manner, with the configuration of the electric actuator according to the present invention, the relative positional relationship among the respective drive members is not influenced by the precision in assembling the cases to one another, and the respective shafts of the motion conversion mechanism and the transmission gear mechanism can stably and reliably be supported. Thus, the axis-to-axis distance between the drive members can be maintained with high precision. As a result, a reduction in operation efficiency and increases in noise and vibration due to the fluctuation in the axis-to-axis distance between the drive members can be prevented.

When the transmission gear mechanism comprises: a first gear arranged coaxially with the output shaft of the driving motor; and a second gear configured to mesh with the first gear, the driving motor can be positioned with respect to the first gear through insertion of the output shaft of the driving motor into a shaft hole of the first gear. As a result, a precision in positioning of the driving motor with respect to the first gear increases.

The driving motor can firmly be mounted to the actuator case through fastening of a stay provided integrally with the driving motor to the actuator case with a plurality of bolts. As a result, a position holding force against a vibration increases, and a displacement of the position of the driving motor can be prevented. Thus, the axis-to-axis distance between the drive members can be maintained with high precision.

When the electric actuator comprises a speed reduction mechanism configured to reduce a speed of the rotary motion of the driving motor, and output the rotary motion reduced in speed to the transmission gear mechanism, a precision in an axis-to-axis distance between the speed reduction mechanism and other drive members can also be increased through mounting of the speed reduction mechanism to the actuator case together with the driving motor.

Advantageous Effects of Invention

According to the present invention, the precision in axis-to-axis distance between the drive members increases, and the axis-to-axis distance can be maintained with high precision. As a result, the reduction in operation efficiency and the increases in noise and vibration due to the fluctuation in the axis-to-axis distance can be prevented.

DESCRIPTION OF EMBODIMENTS

Now, description is made of the present invention with reference to the accompanying drawings. In the respective drawings for illustrating the present invention, components such as members and component parts having the same functions or shapes are denoted by the same reference symbols as long as the components can be distinguished, and description thereof is therefore omitted after the description is made once.

Figure 1:
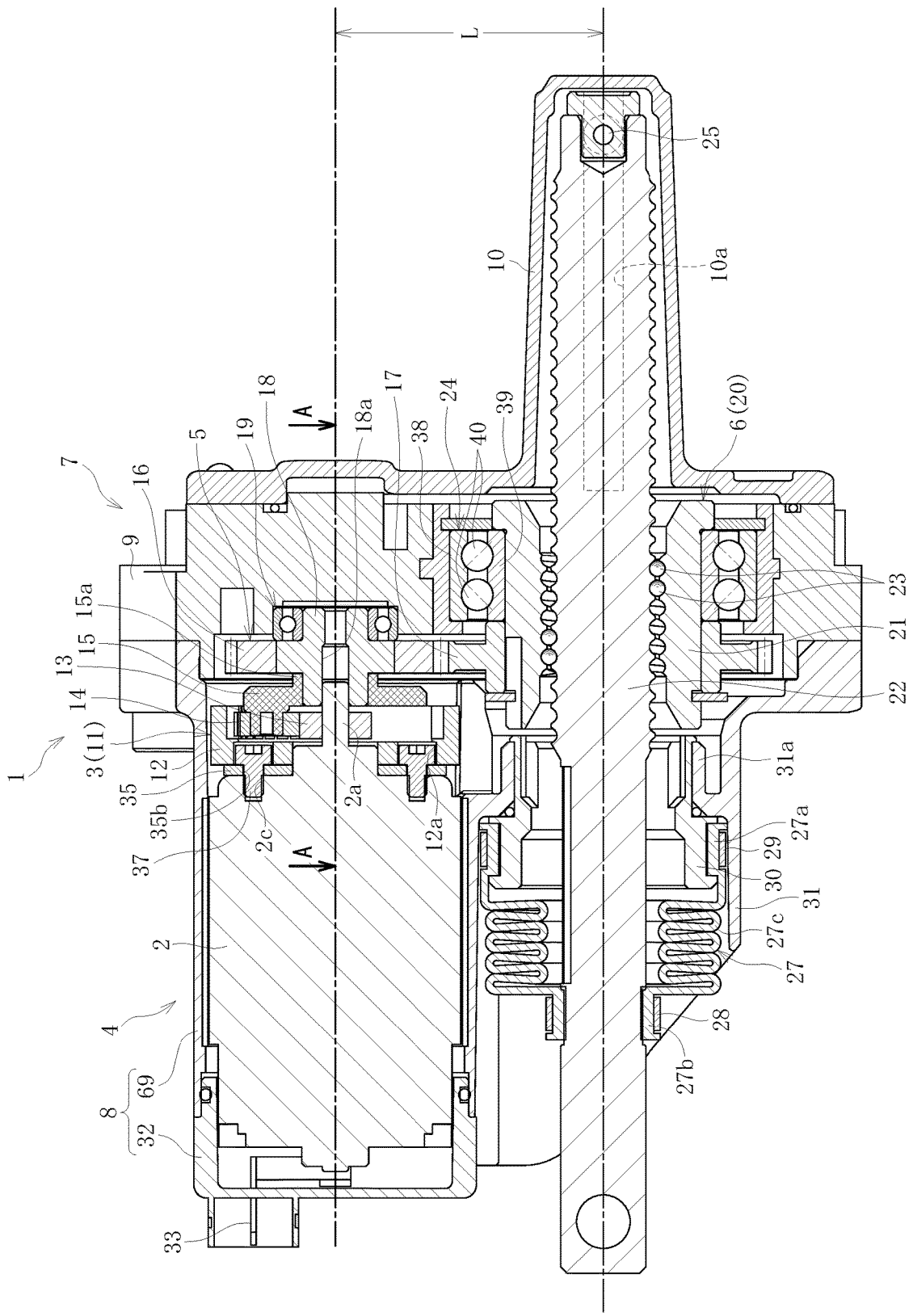
FIG. 1 is a vertical sectional view of an electric actuator according to one embodiment of the present invention.
Figure 2:
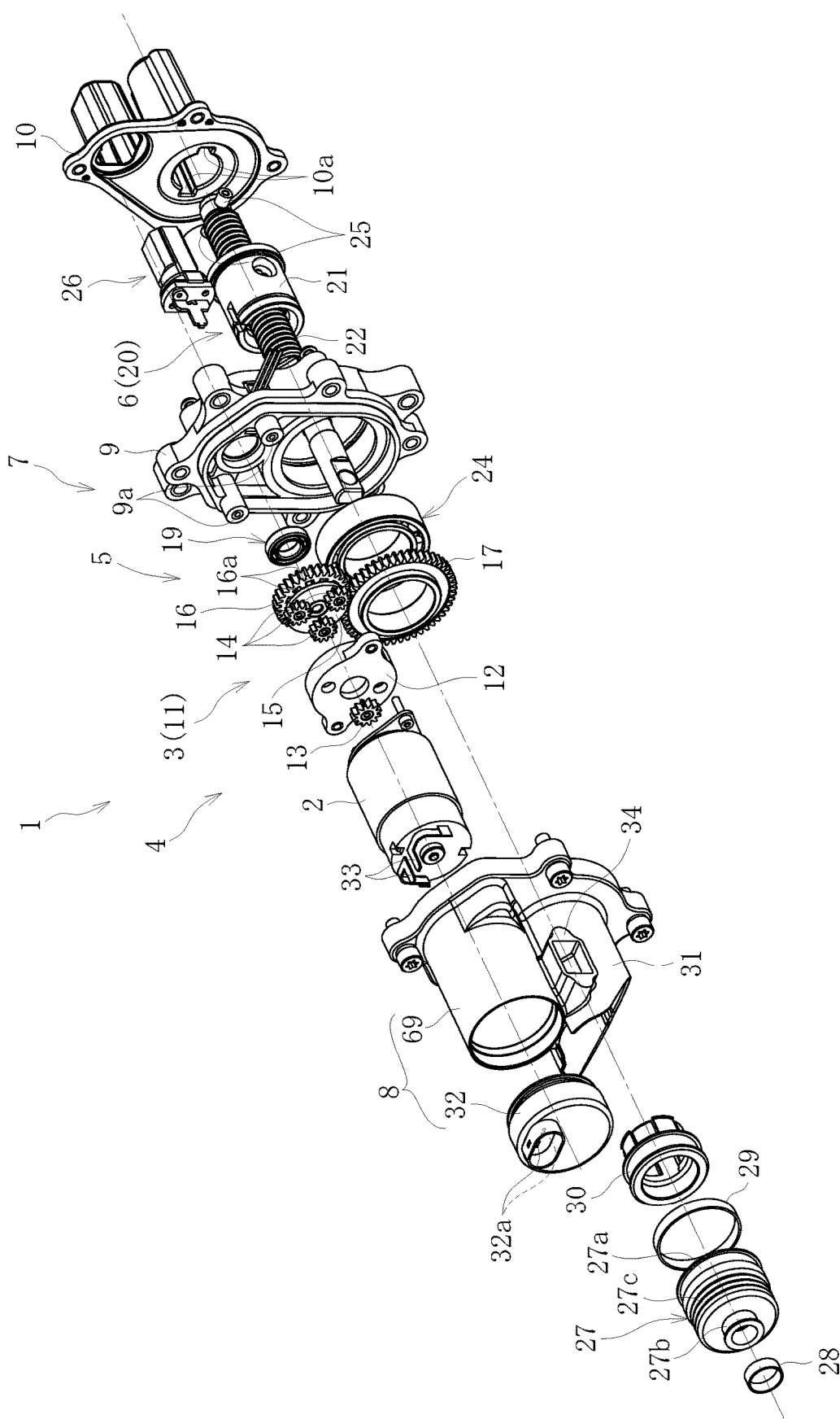
FIG. 2 is an exploded perspective view of the electric actuator.

FIG. 1 is a vertical sectional view of an electric actuator according to one embodiment of the present invention. FIG. 2 is an exploded perspective view of the electric actuator.

As illustrated in FIG. 1 and FIG. 2, the electric actuator 1 according to this embodiment mainly comprises a motor section 4 and a drive transmission/conversion section 7. The motor section 4 comprises a driving motor 2 and a speed reduction mechanism 3. The drive transmission/conversion section 7 comprises a transmission gear mechanism 5 and a motion conversion mechanism 6. As described later, it is not always required that the motor section 4 comprise the speed reduction mechanism 3.

The sections forming the electric actuator 1 comprise respective exterior cases. Components are accommodated or supported in the respective exterior cases. Specifically, the motor section 4 comprises a motor case 8 configured to accommodate the driving motor 2 and the speed reduction mechanism 3. The drive transmission/conversion section 7 comprises an actuator case 9 configured to support the transmission gear mechanism 5 and the motion conversion mechanism 6. Moreover, the motor case 8 comprises a motor-case main body 69 and a cap member 32. The motor-case main body 69 is configured to accommodate the driving motor 2. The cap member 32 is formed independently of the motor-case main body 69. The motor-case main body 69 is mounted to the actuator case 9 so as to be coupled and decoupled in an axial direction of the driving motor 2. The driving motor 2 and the speed reduction mechanism 3 are also mounted to the actuator case 9 so as to be coupled and decoupled in the axial direction. Further, a shaft case 10 configured to accommodate apart of the motion conversion mechanism 6 is mounted to the actuator case 9 on an opposite side of the motor case 8 side so as to be coupled and decoupled in the axial direction. Those exterior cases are assembled to one another through fastening with bolts. Now, description is made of detailed configurations of the respective parts forming the electric actuator 1.

Figure 3:
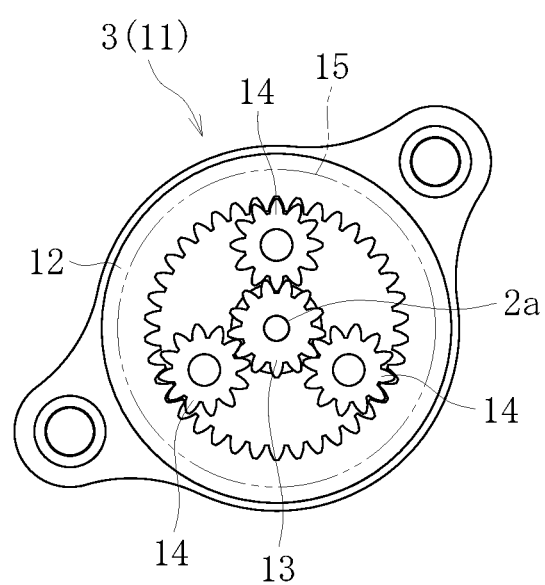
FIG. 3 is a view of a planetary-gear speed reduction mechanism as seen in an axial direction thereof.

FIG. 3 is a view of the speed reduction mechanism as seen in the axial direction thereof.

The speed reduction mechanism 3 comprises a planetary-gear speed reduction mechanism 11 formed of a plurality of gears and the like. As illustrated in FIG. 3, the planetary-gear speed reduction mechanism 11 is formed of a ring gear 12, a sun gear 13, a plurality of planetary gears 14, and a planetary gear carrier 15.

The sun gear 13 is arranged at the center of the ring gear 12. An output shaft 2a of the driving motor 2 is press-fitted to the sun gear 13. Moreover, the plurality of planetary gears 14 are arranged between the ring gear 12 and the sun gear 13 so as to mesh with the ring gear 12 and the sun gear 13. The respective planetary gears 14 are rotatably held by the planetary gear carrier 15.

In the planetary-gear speed reduction mechanism 11, when the driving motor 2 performs the rotational drive, the sun gear 13 coupled to the output shaft 2a of the driving motor 2 rotates, and, along with this rotation, the respective planetary gears 14 revolve along the ring gear 12 while rotating. Then, the planetary gear carrier 15 is rotated by the revolution motion of the planetary gears 14. With this, the speed of the rotation of the driving motor 2 is reduced, the rotation reduced in speed is transmitted, and a rotation torque increases. Through the transmission of the driving force via the planetary-gear speed reduction mechanism 11 in such a manner, a high output of the electric actuator 1 is thus obtained, and downsizing of the driving motor 2 can thus be achieved. In this embodiment, although an inexpensive (brush) DC motor is used as the driving motor 2, other motor such as a brushless motor may be used.

Next, as illustrated in FIG. 1 and FIG. 2, the transmission gear mechanism 5 is formed of a drive gear 16 and a driven gear 17. The drive gear 16 has a small diameter, and serves as a first gear with a rotation shaft arranged coaxially with the output shaft 2a of the driving motor 2. The driven gear 17 has a large diameter, and serves as a second gear which meshes with the drive gear 16. A gear boss 18 (see FIG. 1) serving as a rotation shaft is press-fitted to a rotation center portion of the drive gear 16. One axial end portion (right end portion in FIG. 1) of the gear boss 18 is rotatably supported by a rolling bearing 19 mounted to the actuator case 9. The drive gear 16 and the gear boss 18 may be integrally formed through sintering. Meanwhile, an end portion (left end portion in FIG. 1) of the gear boss on an opposite side is supported through insertion of the output shaft 2a of the driving motor 2 into a shaft hole 18a opened on a side of this end portion. That is, the output shaft 2a of the driving motor 2 is inserted into the gear boss 18 so as to constitute a relationship of a slide bearing rotatable relatively to the gear boss 18.

The gear boss 18 is coupled to the planetary gear carrier 15 so as to integrally rotate. In detail, the planetary gear carrier 15 has a cylindrical portion 15a (see FIG. 1) at a center portion thereof, and the cylindrical portion 15a is press-fitted over an outer peripheral surface of the gear boss 18. The planetary gear carrier 15 may be made of resin, and the gear boss 18 may be molded integrally with the planetary gear carrier 15 by insert molding. As a result, when the driving motor 2 performs rotational drive, and the planetary gear carrier 15 rotates accordingly, the drive gear 16 rotates integrally with the planetary gear carrier 15, and the driven gear 17 thus rotates. This embodiment is configured so that the rotation is reduced in speed (increased in torque) from the drive gear 16 having a small diameter to the driven gear 17 having a large diameter, but the rotation may be transmitted at a constant speed from the drive gear 16 to the driven gear 17.

Now, description is made of the motion conversion mechanism.

The motion conversion mechanism 6 is formed of a ball screw 20 arranged on an axis parallel with the output shaft 2a of the driving motor 2. The motion conversion mechanism 6 is not limited to the ball screw 20, and may be a lead screw device. However, in terms of reducing the rotation torque and downsizing the driving motor 2, the ball screw 20 is more preferred.

The ball screw 20 comprises a ball screw nut 21, a ball screw shaft 22, a large number of balls 23, and a circulation member (not shown). Spiral grooves are formed in each of an inner peripheral surface of the ball screw nut 21 and an outer peripheral surface of the ball screw shaft 22. Two rows of the balls 23 are received between both of the spiral grooves.

The ball screw nut 21 is rotatably supported by a double-row bearing 24 mounted to the actuator case 9. The double-row bearing 24 is fixed through press-fit on a rear end side (right side of FIG. 1) of the ball screw shaft 22 with respect to a portion on the outer peripheral surface of the ball screw nut 21 to which the driven gear 17 is fixed. Meanwhile, rotation of the ball screw shaft 22 is restricted through insertion of a pin 25 serving as a rotation restriction member provided on a rear end portion (right end portion in FIG. 1) of the ball screw shaft 22 into guide grooves 10a in an axial direction formed in an inner peripheral surface of the shaft case 10.

When the ball screw nut 21 rotates, the plurality of balls 23 accordingly circulate through the circulation member while moving along the spiral grooves, and the ball screw shaft 22 advances/retreats in the axial direction along the guide grooves 10a of the shaft case 10. The rotary motion from the driving motor 2 is converted to a linear motion in the axial direction parallel with the output shaft 2a of the driving motor 2 through the advance/retreat of the ball screw shaft 22 in such a manner. A distal end portion (left end portion in FIG. 1) of the ball screw shaft 22 in the advance direction functions as an operation part (actuator head) configured to operate a device to be operated. FIG. 1 is a view for illustrating a state in which the ball screw shaft 22 is arranged at an initial position when the ball screw shaft 22 retreats most toward the right side in FIG. 1.

Moreover, the electric actuator 1 according to this embodiment comprises a lock mechanism 26 (see FIG. 2) configured to prevent an unintended advance/retreat of the ball screw shaft 22. The lock mechanism 26 is mounted to the shaft case 10, and is configured to engage with/disengage from a plurality of engagement holes 16a (see FIG. 2) formed over the drive gear 16 in a circumferential direction thereof. Even when an external force is input from a side of the device to be operated to a side of the ball screw shaft 22, an unintended advance/retreat of the ball screw shaft 22 is prevented, and a position of the ball screw shaft 22 in an advance/retreat direction can be maintained at a predetermined position by the lock mechanism 26 engaging with one of the engagement holes 16a, to thereby restrict the rotation of the drive gear 16. The configuration comprising such a lock mechanism 26 is particularly preferred for a case in which the electric actuator is applied to an application that requires maintenance of a position.

A boot 27 configured to prevent entry of foreign substances into the ball screw nut 21 is mounted on a distal end portion side of the ball screw shaft 22. The boot 27 is formed of a large-diameter end portion 27a, a small-diameter end portion 27b, and a bellows 27c. The bellows 27c is configured to connect the large-diameter end portion 27a and the small-diameter end portion 27b to each other, and extend/contract in the axial direction. The small-diameter end portion 27b is fixed to an outer peripheral surface of the ball screw shaft 22 through tightening a boot band 28. The large-diameter end portion 27a of the boot 27 is fixed to an outer peripheral surface of a boot mounting member 30, which has a cylindrical shape and is mounted to the motor-case main body 69, through tightening a boot band 29.

Moreover, a boot cover 31, which has a cylindrical shape and is configured to protect the boot 27, is provided on an outer side of the boot 27. A cylindrical mounting part 31a (see FIG. 1) is provided on an inner side of the boot cover 31. The boot mounting member 30 is mounted to the mounting part 31a. Both the boot cover 31 and the mounting part 31a are provided integrally with the motor-case main body 69.

Moreover, the cap member 32 is mounted to the motor-case main body 69 on an opposite side of the actuator case 9 side. An insertion hole 32a (see FIG. 2) configured to insert a bus bar 33 configured to supply power from a power source (not shown) to the driving motor 2 is formed in the cap member 32. Further, a sensor case 34 (see FIG. 2) configured to accommodate a stroke sensor configured to detect a stroke of the ball screw shaft 22 is provided integrally on the outer peripheral surface of the motor-case main body 69.

Figure 4:
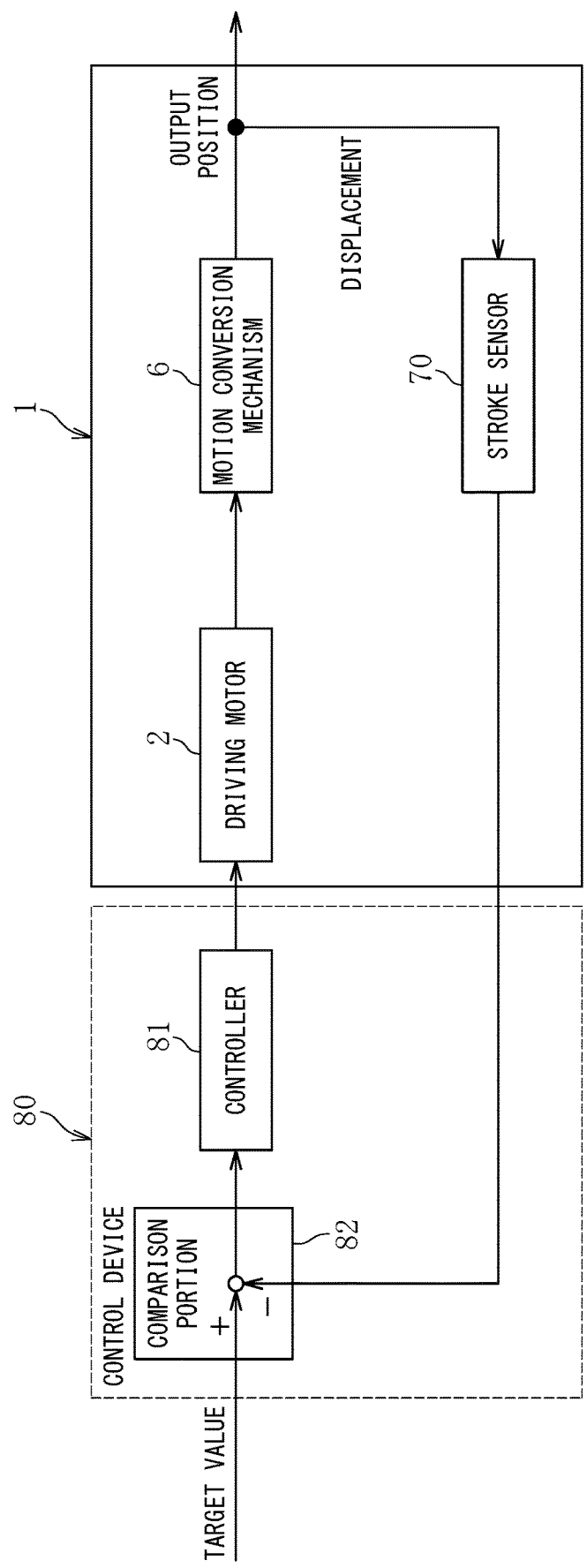
FIG. 4 is a control block diagram of the electric actuator.

Next, with reference to FIG. 4, description is made of feedback control for the electric actuator using the stroke sensor.

As illustrated in FIG. 4, when a target value is transmitted to a control device 80, a control signal is transmitted from a controller 81 of the control device 80 to the driving motor 2. The target value is, for example, a stroke value calculated by an ECU provided at an upper position of a vehicle based on an operation amount when the operation amount is input to the ECU.

When the driving motor 2 receives the control signal, the driving motor 2 starts the rotational drive, and the driving force thereof is transmitted to the ball screw shaft 22 via the planetary-gear speed reduction mechanism 11, the drive gear 16, the driven gear 17, and the ball screw nut 21, and the ball screw shaft 22 thus advances. With this, the device to be operated arranged on the distal end portion side (actuator head side) of the ball screw shaft 22 is operated.

At this time, the stroke value (position in the axial direction) of the ball screw shaft 22 is detected by a stroke sensor 70. The detection value detected by the stroke sensor 70 is transmitted to a comparison portion 82 of the control device 80, and a difference between the detection value and the target value is calculated. Then, the driving motor 2 is driven until the detection value matches the target value. When the electric actuator 1 according to this embodiment is applied to, for example, a shift-by-wire system, a shift position can reliably be controlled by feeding back the stroke value detected by the stroke sensor 70 to control the position of the ball screw shaft 22 in such a manner.

Figure 5:
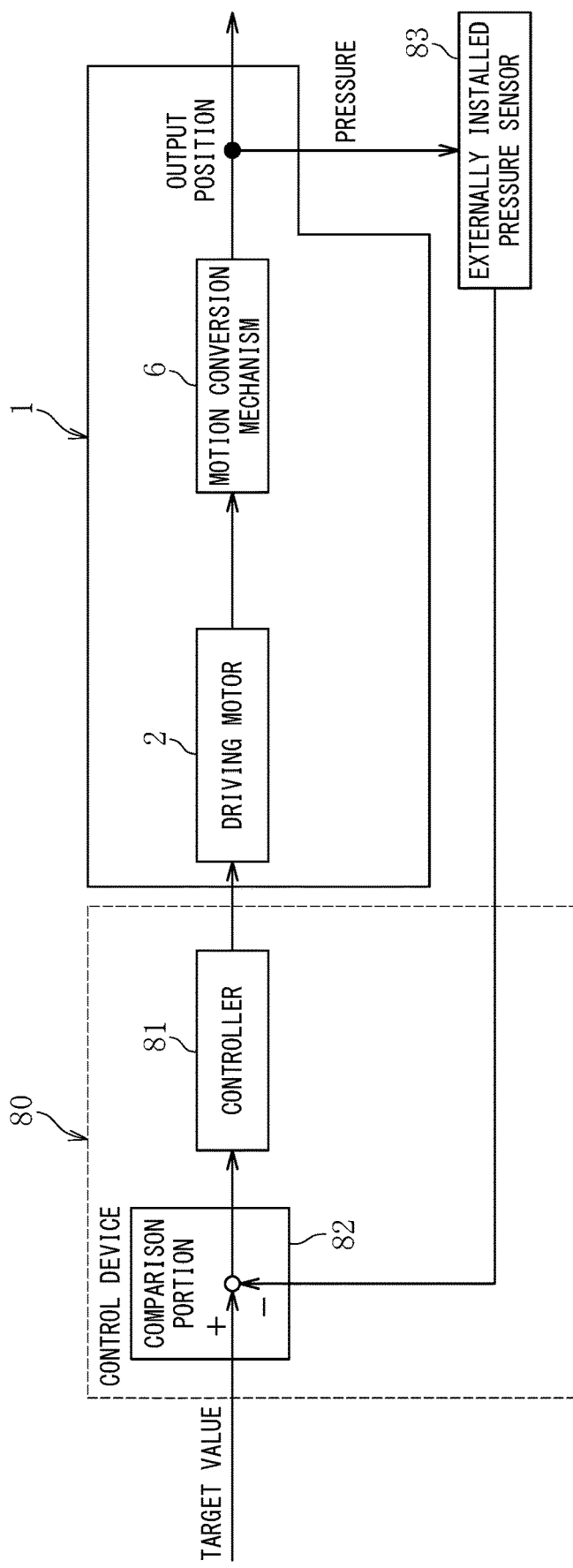
FIG. 5 is a control block diagram of the electric actuator.

Next, with reference to FIG. 5, description is made of feedback control in a case in which a pressure sensor 83 is used in place of the stroke sensor 70.

As illustrated in FIG. 5, in this case, the pressure sensor 83 is provided for the device to be operated. When the operation amount is input to the ECU provided at the upper position of the vehicle, the ECU calculates a required target value (pressure command value). When the target value is transmitted to the control device 80, and the control signal is transmitted from the controller 81 to the driving motor 2, the driving motor 2 starts the rotational drive. With this, the ball screw shaft 22 advances, and the device to be operated arranged on the distal end portion side (actuator head side) of the ball screw shaft 22 is operated to pressurize.

An operation pressure of the ball screw shaft 22 at this time is detected by the pressure sensor 83, and the position of the ball screw shaft 22 is subjected to the feedback control based on the detection value and the target value as in the case of the use of the stroke sensor 70. When the electric actuator 1 according to this embodiment is applied to, for example, a brake-by-wire system, a hydraulic pressure of a brake can reliably be controlled by feeding back the pressure value detected by the pressure sensor 83 to control the position of the ball screw shaft 22 in such a manner.

Now, description is made of a configuration of an electric actuator according to a comparative example other than the present invention.

Figure 10:
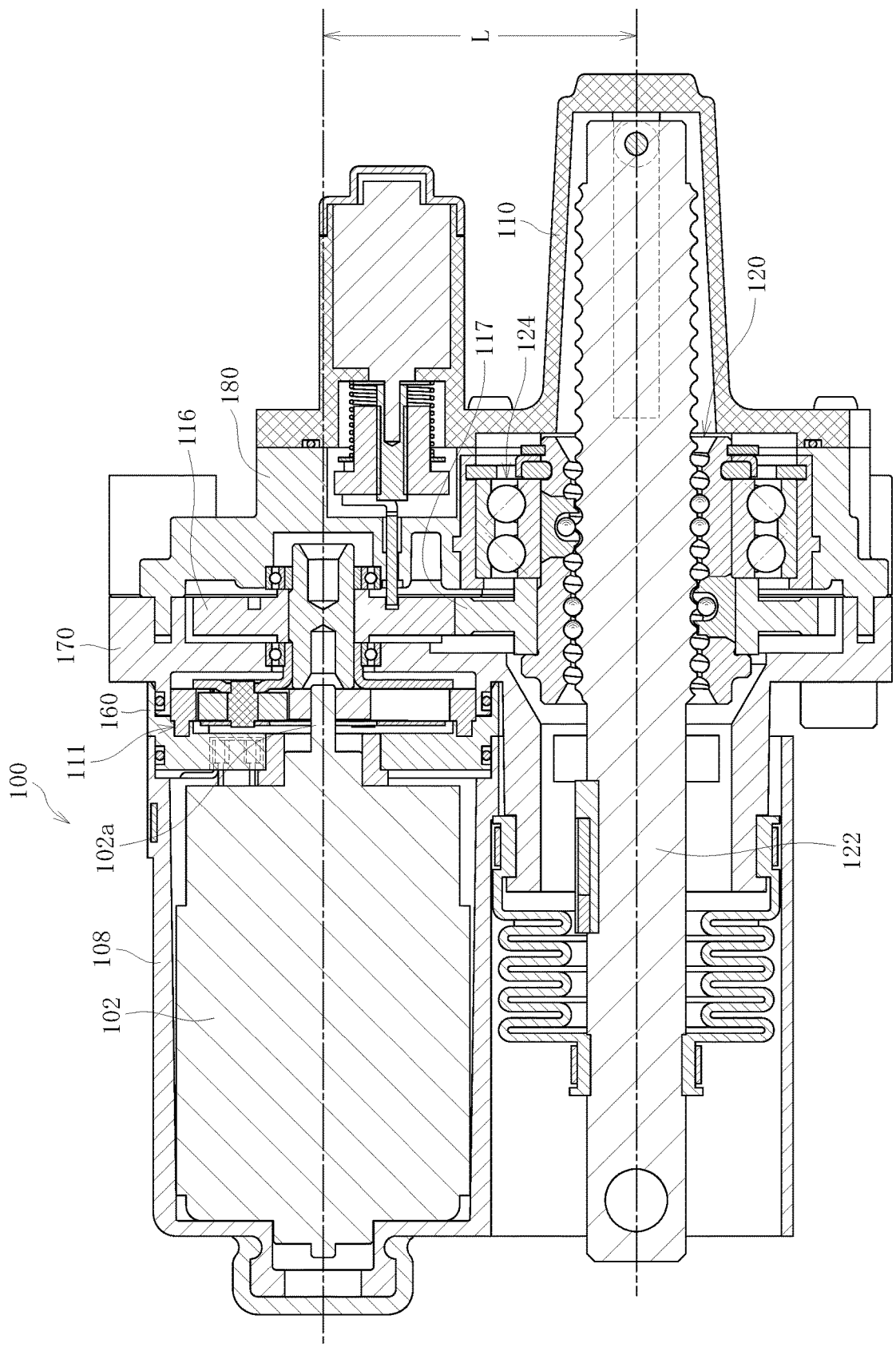
FIG. 10 is a vertical sectional view of an electric actuator according to a comparative example.

An electric actuator 100 according to a comparative example illustrated in FIG. 10 comprises a driving motor 102, a planetary-gear speed reduction mechanism 111, a drive gear 116, a driven gear 117, and a ball screw 120 as in the embodiment of the present invention. The planetary-gear speed reduction mechanism 111 serves as the speed reduction mechanism. The drive gear 116 and the driven gear 117 serve as the transmission gear mechanism. The ball screw 120 serves as the motion conversion mechanism. The electric actuator 100 is different from the electric actuator according to the embodiment of the present invention in configurations of cases configured to accommodate or support those drive members.

Specifically, cases configured to accommodate or support the drive members comprise a motor case 108, a speed-reduction gear case 160, a transmission gear case 170, a bearing case 180, and a shaft case 110 in this order from the left side of FIG. 10. The motor case 108 is configured to accommodate the driving motor 102. The speed-reduction gear case 160 is configured to accommodate the planetary-gear speed reduction mechanism 111. The transmission gear case 170 is configured to accommodate the drive gear 116 and the driven gear 117. The bearing case 180 is configured to accommodate a double-row bearing 124 configured to support the ball screw 120. The shaft case 110 is configured to accommodate a side of a rear end portion of a ball screw shaft 122 of the ball screw 120. With the configurations of such cases, together with the cases, the drive members can be coupled to and decoupled from one another under a state in which the drive member is accommodated in each of the cases.

However, in this configuration, there is such a problem that an axis-to-axis distance L (in the radial direction) between the drive members is influenced by a precision in assembling the cases to one another. Moreover, in the comparative example, the driving motor 102 is positioned with respect to the motor case 108 by crimping and fixing bus bars (metal members each having a belt shape) on motor terminals provided on a side of an output shaft 102a. Therefore, the comparative example has such a problem that a position holding force against a vibration is weak, and a position of a shaft of the driving motor 102 is thus unstable.

Compared with the comparative example having such a problem, in the electric actuator 1 according to the embodiment of the present invention, as illustrated in FIG. 1, the drive gear 16, the driven gear 17, and the ball screw 20 are supported by the same case through mounting of the rolling bearing 19 configured to support the drive gear 16 and the double-row bearing 24 configured to support the ball screw 20 to the actuator case 9. Further, in the electric actuator 1 according to this embodiment, in addition to the drive gear 16, the driven gear 17, and the ball screw 20, the driving motor 2 and the planetary-gear speed reduction mechanism 11 are also supported by the same case (actuator case 9) through mounting of the driving motor 2 and the planetary-gear speed reduction mechanism 11 to the actuator case 9.

Figure 6:
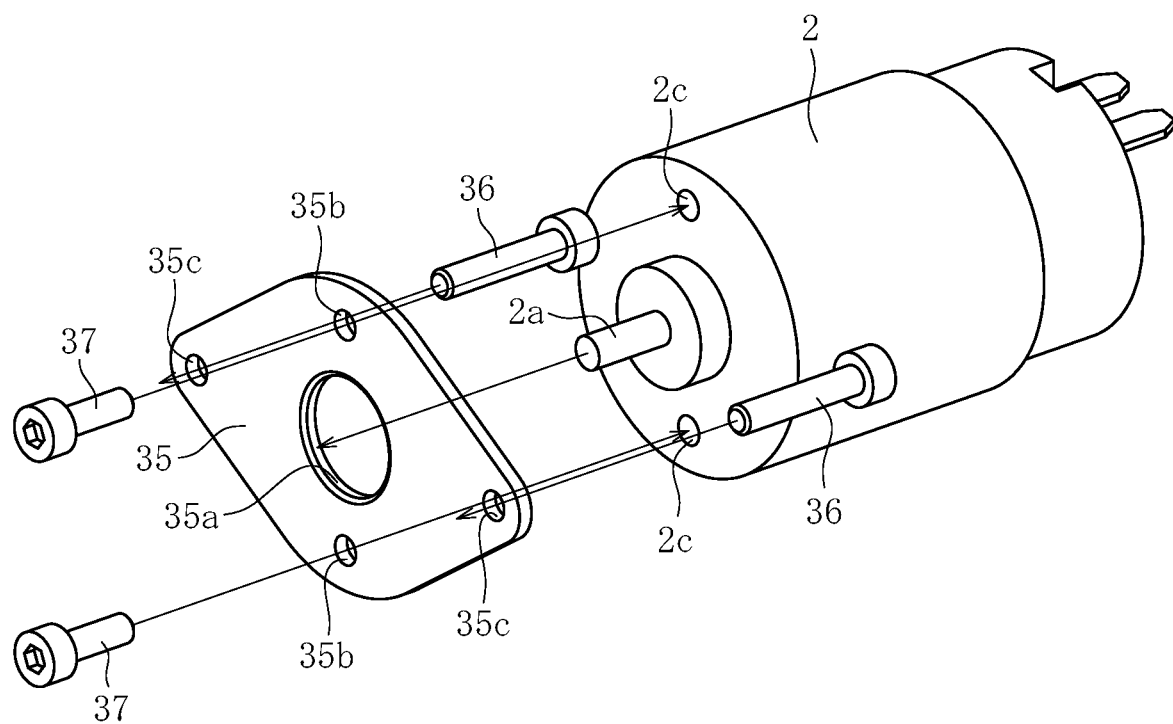
FIG. 6 is a perspective view of a method of mounting a driving motor and a stay.
Figure 7:
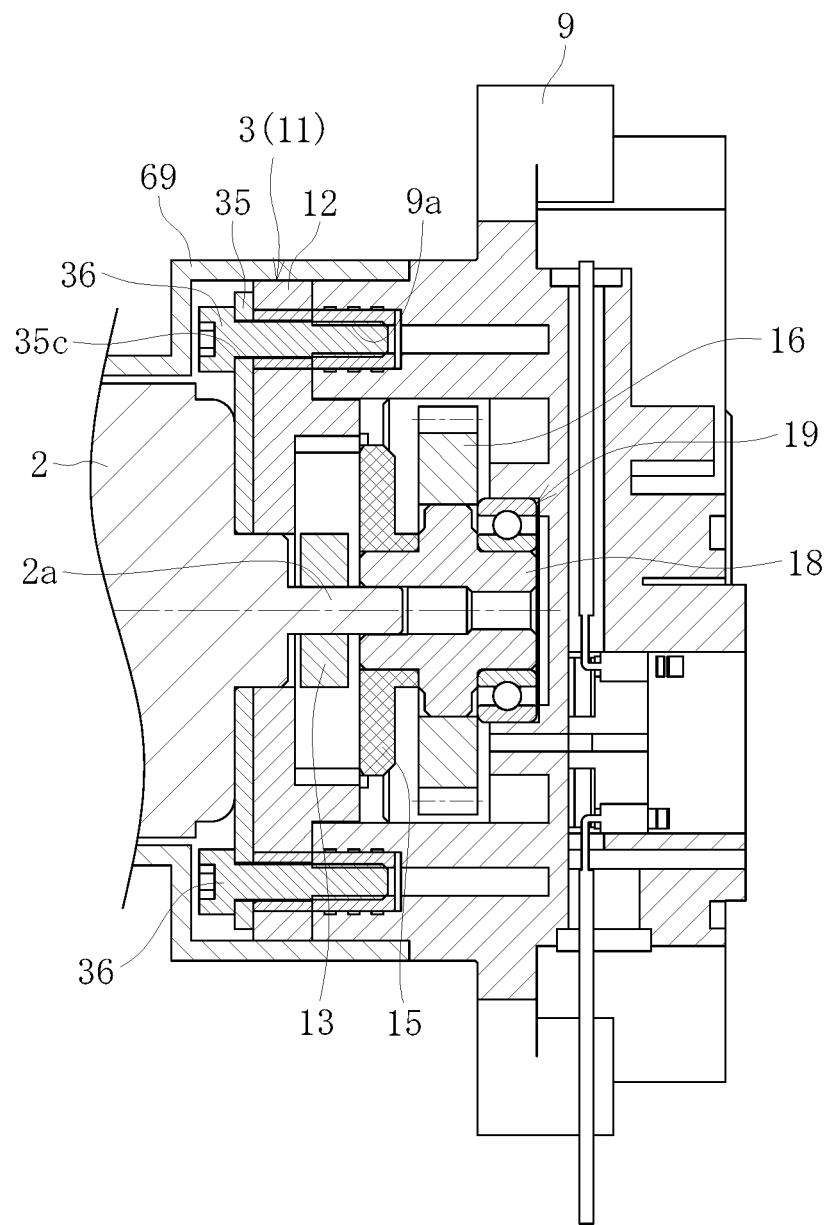
FIG. 7 is a transverse sectional view as seen in a direction indicated by the arrows of the line A-A in FIG. 1.

Specifically, as illustrated in FIG. 6, the driving motor 2 is mounted to the actuator case 9 by, first, inserting the output shaft 2a of the driving motor 2 into a hole portion 35a formed at a center of a stay 35 having a plate shape, then inserting two bolts 37 through bolt insertion holes 35b of the stay 35, and threadedly engaging the two bolts 37 with threaded holes 2c formed in the driving motor 2. As a result, the stay 35 is integrally fixed to the driving motor 2. Then, the stay 35 is fastened to the actuator case 9 by inserting other two bolts 36 through other bolt insertion holes 35c formed in the stay 35 from an opposite side of the bolts 37, and threadedly engaging the bolts 36 with threaded holes 9a (see FIG. 2) formed in the actuator case 9. As a result, the driving motor 2 is directly mounted to the actuator case 9 without intermediation of the motor case 8. Moreover, the state in which the stay 35 is fastened to the actuator case 9 with the bolts 36 is illustrated in FIG. 7, which is a transverse sectional view as seen in a direction indicated by the arrows of the line A-A in FIG. 1. Under the state in which the driving motor 2 is mounted to the actuator case 9, the driving motor 2 is positioned with respect to the drive gear 16 by rotatably inserting a distal end portion of the output shaft 2a of the driving motor 2 into the shaft hole 18a of the gear boss 18. Moreover, the driving motor 2 is also positioned with respect to the actuator case 9 through intermediation of the gear boss 18 and the rolling bearing 19.

The planetary-gear speed reduction mechanism 11 is mounted to the actuator case 9 together with the driving motor 2 by fastening the ring gear 12 to the actuator case 9 with the bolts 36 configured to fasten the driving motor 2 (see FIG. 7). Hole portions 12a (see FIG. 1) configured to avoid interference with the bolts 37 are formed in the ring gear 12. Under the state in which the ring gear 12 is mounted to the actuator case 9, the ring gear 12 is held while the ring gear 12 is in contact with the stay 35.

In such a manner, in the electric actuator 1 according to this embodiment, the respective drive members comprising the driving motor 2, the planetary-gear speed reduction mechanism 11, the drive gear 16, the driven gear 17, and the ball screw 20 are mounted to the same case (actuator case 9). Thus, a relative positional relationship among those drive members is not influenced by the precision in assembling the cases to one another, and a precision in the axis-to-axis distance L (see FIG. 1) between the drive members increases. Moreover, the driving motor 2 is not fixed through crimping by bus bars, but directly fixed to the actuator case 9 with the bolts. The position holding force against a vibration thus increases, thereby being capable of preventing a position displacement. Therefore, the axis-to-axis distance L between the drive members can be maintained with high precision, and a reduction in operation efficiency and increases in noise and vibration due to the fluctuation in the axis-to-axis distance L can be prevented.

Figure 11:
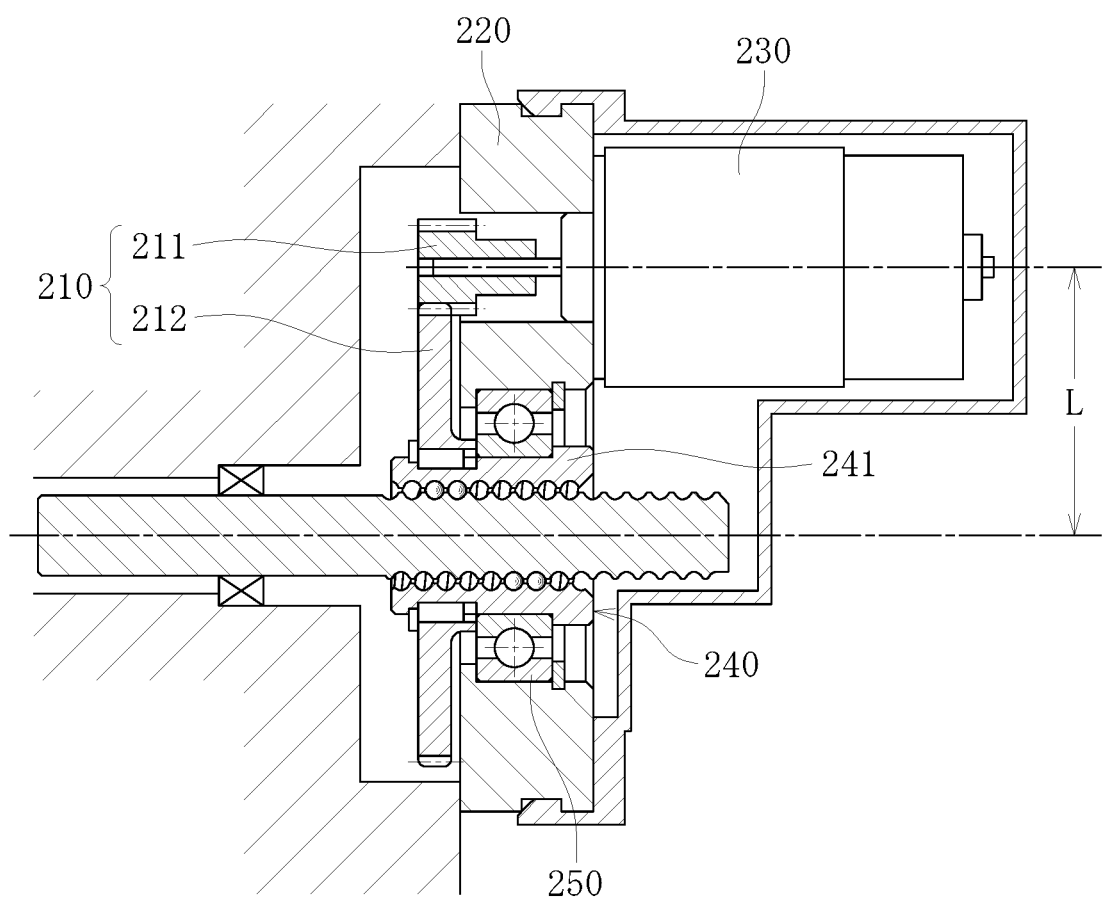
FIG. 11 is a vertical sectional view of a related-art electric linear actuator.

Further, in this embodiment, the one end portion of the gear boss 18 mounted to the drive gear 16 is supported by the rolling bearing 19, and the another end portion is supported by the output shaft 2a of the driving motor 2. Thus, a posture of the drive gear 16 is stabilized. That is, unlike a related-art configuration illustrated in FIG. 11 in which an input gear 211 is supported only on a side of one end portion by a motor shaft of an electric motor 230, in this embodiment, the drive gear 16 is supported on the sides of the both end portions, and thus a runout of the shaft of the drive gear 16 decreases so that the posture is stabilized. Moreover, in this embodiment, as a support bearing configured to support the ball screw 20, the double-row bearing 24 is used. Thus, compared with the related-art configuration in which a ball screw mechanism 240 is supported by a single-row support bearing 250 illustrated in FIG. 11, the runout of the shaft of the ball screw decreases so that the posture is stabilized. With the configuration in this embodiment, the shaft of each of the drive gear 16 and the ball screw 20 can stably and reliably be supported, and hence the axis-to-axis distance L between the drive members can be further maintained with high precision. As a result, an electric actuator having high reliability against a vibration can be provided.

Moreover, in this embodiment, a double-row angular contact ball bearing is used as the double-row bearing 24 to stably support the ball screw 20. As illustrated in FIG. 1, any of balls 40 in two rows interposed between an outer ring 38 and an inner ring 39 are in contact with raceway surfaces of the outer ring 38 and raceway surfaces of the inner ring 39 at contact angles, and the double-row angular contact ball bearing can thus support a radial load as well as axial loads in both directions, thereby being capable of stably and reliably supporting the ball screw 20 performing the linear motion. The contact angle is an angle formed between a plane (radial plane) perpendicular to a center axis of the bearing and a line of action (long dashed short dashed line passing through the center of each of the balls 40 illustrated in FIG. 1) of a resultant force of forces transmitted from the raceway surface to the ball 40. Further, in this embodiment, there is employed a so-called back-to-back configuration in which the lines of actions of the respective balls 40 are arranged so as to cross each other on the radially outer side, which is also advantageous with respect to a moment load. In such a manner, in this embodiment, the ball screw 20 can stably and reliably be supported in the cantilever state against the loads in the various directions through employment of the back-to-back double-row angular contact ball bearing as the double-row bearing 24. Therefore, a reduction in operation efficiency and increases in noise and vibration due to an occurrence of a runout in the shaft of the ball screw 20 can be prevented.

Moreover, the ball screw 20 can be supported in the cantilever state through use of the double-row bearing 24 as the support bearing configured to support the ball screw 20. That is, as illustrated in FIG. 1, there can be provided such a configuration that the double-row bearing 24 is arranged only on one side (right side) with respect to the driven gear 17, and any bearing configured to support the ball screw 20 is not arranged on the opposite side (left side). Through arrangement of the support bearing configured to support the ball screw 20 only on the one side with respect to the driven gear 17 in such a manner, it is not required to consider interference between the support bearing and other components on the side on which the support bearing is not arranged. As a result, a degree of freedom in designing a component layout increases, and downsizing can also be achieved.

The double-row bearing 24 configured to support the motion conversion mechanism 6 is not limited to the double-row angular contact ball bearing, and a pair of single-row angular contact ball bearings may be combined for use. In addition to the angular contact ball bearing, other double-row bearing using, for example, a deep groove ball bearing can be applied.

Figure 8:
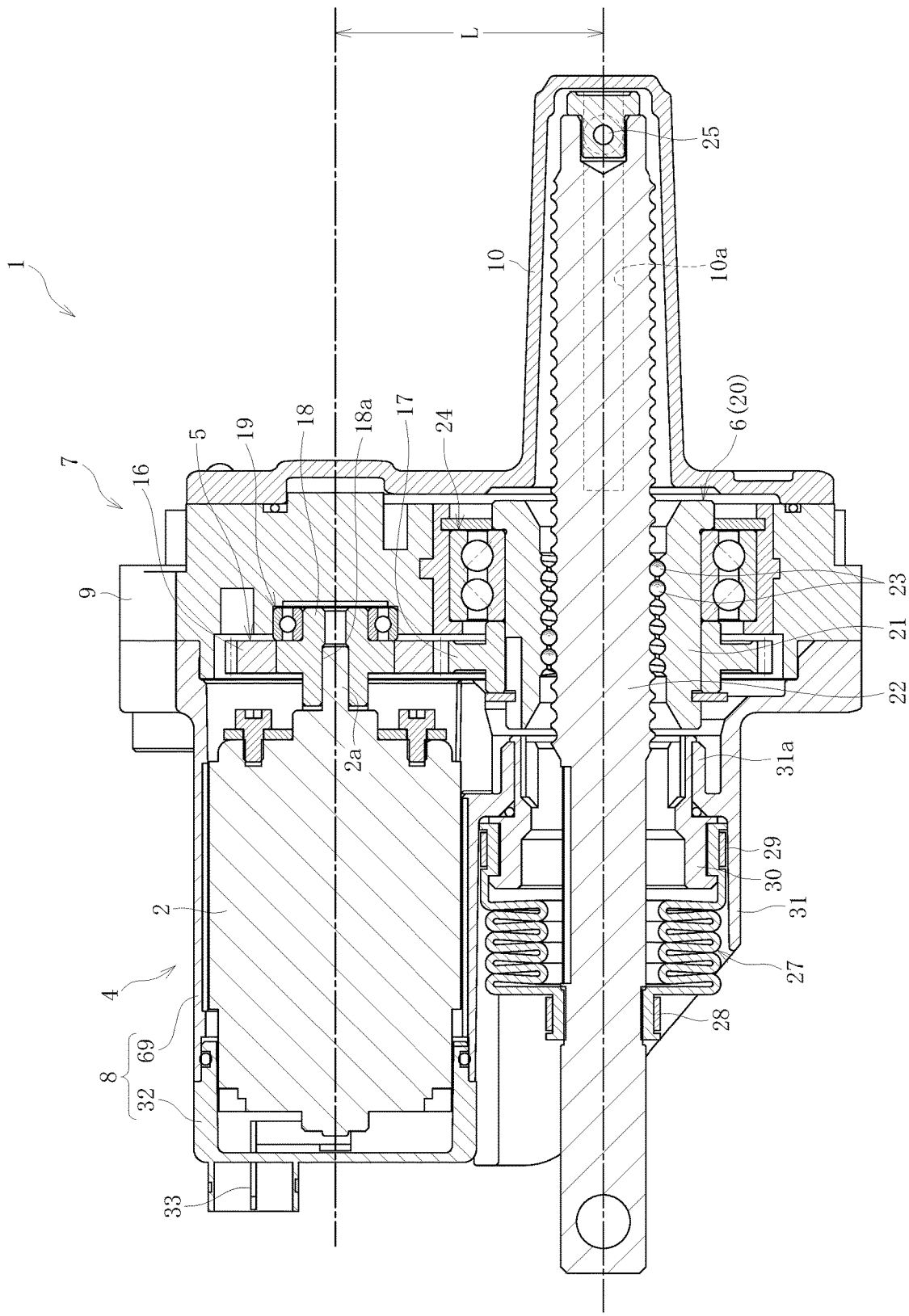
FIG. 8 is a vertical sectional view of the electric actuator according to another embodiment of the present invention.
Figure 9:
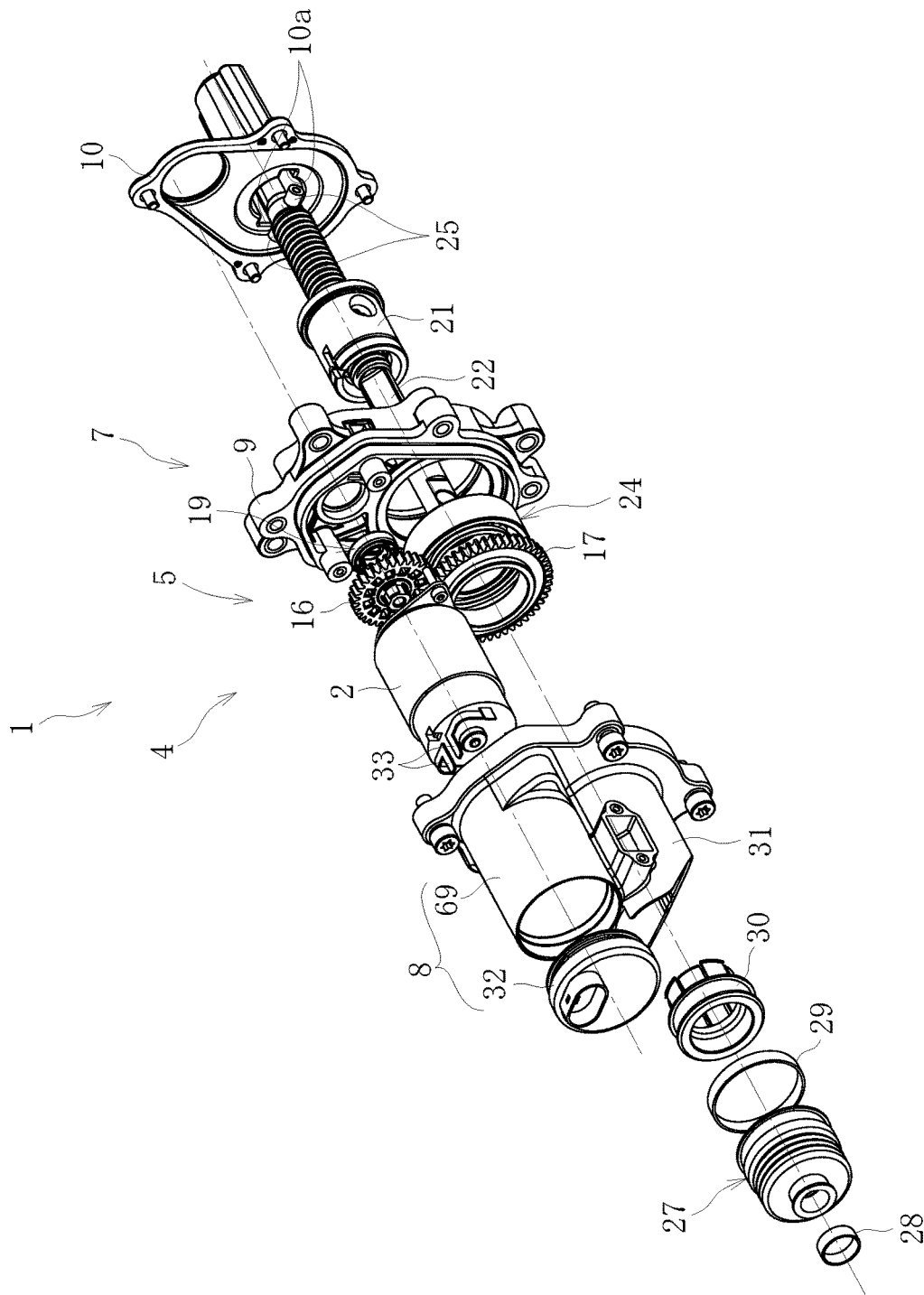
FIG. 9 is an exploded perspective view of the electric actuator according to the another embodiment.

FIG. 8 is a vertical sectional view of an electric actuator according to another embodiment of the present invention. FIG. 9 is an exploded perspective view of the electric actuator according to the another embodiment.

The electric actuator illustrated in FIG. 8 and FIG. 9 does not comprise the planetary-gear speed reduction mechanism 11 and the lock mechanism 26 provided for the electric actuator illustrated in FIG. 1 to FIG. 7. Therefore, the length of the motor case 8 (motor-case main body 69) is reduced a little in the axial direction, and the shaft case 10 has a shape without a portion configured to accommodate the lock mechanism 26. Moreover, in this case, the output shaft 2a of the driving motor 2 is coupled through press-fit to the shaft hole 18a of the gear boss 18, and the driving force of the driving motor 2 is directly transmitted to the drive gear 16 (without intermediation of the planetary-gear speed reduction mechanism 11), and is transmitted from the drive gear 16 to the ball screw 20 through the driven gear 17.

In such a manner, the electric actuator adapted to other applications and specifications can be formed by only omitting the planetary-gear speed reduction mechanism 11 and the lock mechanism 26 and replacing the motor case 8 (motor-case main body 69) and the shaft case 10 with other cases, without changing many common parts. Thus, with the configuration of the electric actuator according to this embodiment, an electric actuator which is low in cost and excellent in versatility can be provided also for deployment as multiple types to an electric parking brake mechanism for vehicles including two-wheeled vehicles, an electric/hydraulic brake mechanism, an electric shift change mechanism, and an electric power steering as well as a 2WD/4WD electric switching mechanism and an electric shift change mechanism for an outboard engine (for a vessel propulsion engine).

The electric actuator according to the another embodiment is configured as in the embodiment illustrated in FIG. 1 to FIG. 7 in points other than those described above. Thus, also in the electric actuator according to the another embodiment, as in the embodiment illustrated in FIG. 1 to FIG. 7, the driving motor 2 is mounted to the actuator case 9 without intermediation of the motor case 8. That is, also in the another embodiment, the respective drive members comprising the driving motor 2, the drive gear 16, the driven gear 17, and the ball screw 20 are mounted to the same case (actuator case 9). Thus, the relative positional relationship among those drive members is not influenced by the precision in assembling the cases to one another, and the precision in the axis-to-axis distance L between the drive members increases. Moreover, as in the embodiment illustrated in FIG. 1 to FIG. 7, the drive gear 16 is supported by the bearing 19 mounted to the actuator case 9, and the ball screw 20 is supported by the double-row bearing 24 mounted to the actuator case 9. Thus, the postures of the drive gear 16 and the ball screw 20 are stabilized, thereby providing such a configuration that the runouts of those shafts are less likely occur.

Description is made of the embodiments of the present invention. However, the present invention is not limited to the above-mentioned embodiments. As a matter of course, the present invention may be carried out in various modes without departing from the spirit of the present invention.

REFERENCE SIGNS LIST 1 electric actuator
2 driving motor
2a output shaft
3 speed reduction mechanism
5 transmission gear mechanism
6 motion conversion mechanism
9 motor case
16 actuator case
17 drive gear (first gear)
18 driven gear (second gear)
18 gear boss
18a shaft hole
19 rolling bearing
24 double-row bearing
35 stay

The invention claimed is:

1. An electric actuator, comprising:
a driving motor;
a motion conversion mechanism configured to convert a rotary motion of the driving motor to a linear motion in an axial direction parallel with an output shaft of the driving motor;
a transmission gear mechanism configured to transmit a driving force from the driving motor to the motion conversion mechanism;
a speed reduction mechanism configured to reduce a speed of the rotary motion of the driving motor, and output the rotary motion reduced in speed to the transmission gear mechanism;
a motor case configured to accommodate the driving motor and the speed reduction mechanism; and
an actuator case configured to accommodate a double-row bearing for supporting the motion conversion mechanism and a bearing for supporting the transmission gear mechanism, and to be couplable to the motor case,
wherein the driving motor, the speed reduction mechanism, the double-row bearing, and the bearing are mounted to the single actuator case without intermediation of other cases including the motor case,
wherein the transmission gear mechanism comprises:
a first gear arranged coaxially with the output shaft of the driving motor; and
a second gear configured to mesh with the first gear,
wherein the speed reduction mechanism is arranged between the driving motor and the first gear,
wherein a stay fastened to the driving motor is housed in the motor case, and is arranged between the driving motor and the speed reduction mechanism, and
wherein the stay and the speed reduction mechanism are mounted to the single actuator case with a common bolt.

2. The electric actuator according to claim 1, wherein the driving motor is positioned with respect to the first gear through insertion of the output shaft of the driving motor into a shaft hole of the first gear.

* * * * *